(12) United States Patent
Ku et al.

(10) Patent No.: US 7,401,275 B1
(45) Date of Patent: Jul. 15, 2008

(54) AUTOMATED TEST AND CHARACTERIZATION WEB SERVICES

(75) Inventors: Tina Pai-Lin Ku, Hayward, CA (US); Paul Ronald Ballintine, Pleasanton, CA (US); Roopa Krishnaiah-Felton, Danville, CA (US); Gean Hsu, Fremont, CA (US); Duane Smith, Pleasanton, CA (US); Jaime Sarmiento, Tracy, CA (US)

(73) Assignee: Lam Research Corporation, Fremont, CA (US)

( * ) Notice: Subject to any disclaimer, the term of this patent is extended or adjusted under 35 U.S.C. 154(b) by 284 days.

(21) Appl. No.: 11/093,094

(22) Filed: Mar. 28, 2005

(51) Int. Cl.
*G01R 31/28* (2006.01)
*G06F 11/00* (2006.01)

(52) U.S. Cl. .................................. 714/724; 714/25
(58) Field of Classification Search .................. None
See application file for complete search history.

(56) References Cited

U.S. PATENT DOCUMENTS 6,662,217 B1  12/2003  Godfrey et al.
7,016,946 B2   3/2006  Shirriff
7,165,189 B1*  1/2007  Lakkapragada et al. ....... 714/31
2002/0162059 A1* 10/2002 McNeely et al. ............. 714/703
2005/0138113 A1*  6/2005 Brendle et al. .............. 709/203

OTHER PUBLICATIONS

"International Search Report", Issue in PCT Application No.: PCT/US2007/75213; Mailing Date.: Apr. 7, 2008.
"Written Opinion", Issue in PCT Application No.: PCT/US2007/75213; Mailing Date.: Apr. 7, 2008.

* cited by examiner

*Primary Examiner*—Christine T Tu
(74) *Attorney, Agent, or Firm*—IP Strategy Group, P.C.

(57) ABSTRACT

A testing arrangement for testing a plasma cluster tool having system control software (SCS) for controlling the plasma cluster tool during production. The testing arrangement includes a data manager module for obtaining, via a computer network, specification data pertaining to a component of the plasma cluster tool. The testing arrangement further includes a test manager module configured to provide a set of tests for testing the component, the set of tests incorporating data obtained in the specification data. The testing arrangement additionally includes a SCS interface engine configured to communicate the set of tests with the system control software of the plasma cluster tool, thereby enabling the SCS to execute at least a test in the set of tests to test the component.

22 Claims, 6 Drawing Sheets

| Component | Test Fixtures | Data Logging | Reporting and Access | Control Logic |
|---|---|---|---|---|
| Process Module 102 | LamWorks | SQL | Internal Intranet Paper Printout | Different than Target Control System |
| Component 106 | LamWorks | SQL | Internal Intranet PDF format | Different than Target Control System |
| Component 108 | LabView | SQL | Paper Printout | Different than Target Control System |
| Transfer Module 111 | None | Hand-written report | PDF format | Different than Target Control System |

FIG. 1B Prior Art

AUTOMATED TEST AND CHARACTERIZATION WEB SERVICES

BACKGROUND OF THE INVENTION

A plasma cluster tool is made up of a plurality of modules (i.e., processing module, transfer module, etc.). Each of these modules is made up of a plurality of subsystems (i.e., RF match, gas box, TCP match, bias match, etc.). For ease of discussion, the term "component" will be used to refer to an atomic or a multi-part assembly in a plasma cluster tool. Thus, a component may be as simple as a gas line or may be as complex as the entire process module. A multi-part component (such as a process module) may be formed from other multi-part components (such as a vacuum system, a gas system, a power supply system, etc), which may in turn be formed from other multi-part or atomic components.

Generally, the various components of a plasma cluster tool may be manufactured by more than one party. For example, a manufacturer of plasma cluster tool, such as Lam Research Corporation of Fremont, Calif., typically utilizes components from a member of third-party suppliers in the manufacturing of a plasma cluster tool. In fact, such practice is standard in the semiconductor processing equipment field since it permits companies to focus on their strengths while delegating tasks outside of their fields of interest or expertise to other companies.

Before a plasma cluster tool is sent to a customer by a manufacturer, a multitude of quality control tests are performed on the plasma cluster tool and its various components. The tests may be performed by the manufacturer and/or by a third-party. Currently, a standard testing framework does not exist. Tests performed internally allow the manufacturer some control on the testing methodology. However, tests that have been outsourced to a third-party allow the manufacturer limited or no control over the tests that are performed.

To aid in testing components, test fixtures may be available. As discussed herein, a test fixture is hardware with a software interface that allows a component to be tested in a simulated processing environment. For example, a test fixture is created to test an AC/DC box. The test fixture is able to test the wiring connection, the power components, etc. The test fixture is also able to log the data and stores the data on the test fixture.

Tests that are performed using test fixtures created by the manufacturer allow the manufacturer some control on the testing methodology that may be used. If the tests are performed internally, the manufacturer may have access to the electronic version of the data that are gathered, thus enabling the manufacturer the ability to manipulate the data for analysis. However, for tests that are performed off-site by a third-party, the manufacturer generally has limited access to the data since the data is usually provided to the manufacturer in a paper or image format. As a result, the manufacturer may have difficulties manipulating the data for analysis.

In some situations, test fixtures may be created by third-party suppliers. In these situations, the third-party suppliers may have incorporated their own testing methodology and control logic (which may differ significantly from the production environment of the plasma cluster tool) into the test fixtures. Consequently, the manufacturer is dependent upon testers using test fixtures created by third-party suppliers to perform good tests and collect relevant data on the components.

In some instances, a test fixture may not exist for a component. Thus, any testing that may be performed on the component has to be performed manually using paper procedures. With paper procedures, the quality of the test is dependent upon a tester's skills and discretion. Furthermore, the procedures are subjected to interpretation by the tester. Also, the tester may not always perform all steps completely. In some cases, a tester may fabricate data. Thus, test results may be inconsistent and may lack integrity.

Since the testing methodology may vary, the data that is gathered may differ in substance and quality depending upon the testing methodology and the tester. Further, the reports that are produced from the testing may vary by format and substance. If the testing is performed internally, the manufacturer may have access to the electronic data and may have some ability to manipulate the data and to produce reports that are usable by the manufacturer. However, if tests are performed off-site by a third-party, an electronic copy of the data is usually not available. Instead, the third-party usually provides a paper or an image copy of the data and the manufacture is unable to manipulate the data. As a result, traceability is almost impossible when a problem arises.

To facilitate discussion, FIG. 1A shows an example of a plasma cluster tool with a process module 102 and a transfer module 111. Within process module 102 are components 106 and 108 (i.e., Gas Box and RF Match. Attached to process module 102 is a test fixture 112 (i.e., LamWorks), which enables the entire process module 102 to be tested. Additional test fixtures (i.e., LamWorks based test fixture 104 and Nyker Labview test fixture 110) are attached to components 106 and 108.

As discussed, test fixtures are not always available. In this example, a test fixture is not available for transfer module 111. Thus, tests that may be performed on transfer module 111 have to be performed using paper procedures and the data has to be gathered manually by the tester.

FIG. 1B shows a chart of the components in FIG. 1A and the testing architecture associated with these components. For process module 102, a test fixture (i.e., LamWorks) produced internally by the manufacturer is attached. The data collected by the test fixture is logged onto a SQL database. The reporting or access to the report is limited to an internal intranet or a paper printout. Also, even though the test fixture is internally produced, the control system is different from that of the actual production environment. Thus, possibility of a discrepancy between the production and test environments will most likely exist.

Likewise, the test fixture (i.e., LamWorks) attached to component 106 (i.e., RF Match) is internally created but has been sent off-site to a third-party to test the component. Thus, the manufacture is most likely to receive a paper printout only. Further, the control logic for the test fixture is not the actual production environment.

In regard to component 108 (i.e., Gas Box), test fixture (i.e., Nyker using LabView) may be created by a third-party. The data collected by the test fixture is also store onto a SQL database. However, since it is not an internal test fixture, the manufacturer is usually limited to paper printout only. As with the previous test fixtures, the control logic may also be different than that of the production environment.

In some cases, a component, such as transfer module 111, may not have a test fixture associated with the component. In situations where there are no test fixtures, the tester has to rely on paper procedures to perform any type of test on the component. The test methodology for this situation is usually dependent upon the skill and knowledge of the tester. Further, the data collected is dependent upon the discretion of the tester. For example, the tester may choose not to perform a thorough test (such as skipping some of the steps) or the tester may choose to bypass the test and fabricate the data. Generally, the data collected is stored directly on paper and the information is scanned into the system. Like the other scenarios, the control logic may differ from the one in the production environment.

As can be appreciated from the above-discussion, the control logic for testing usually does not resemble that of the production environment. Further, each test fixture may have its own control logic. As a result, the test environment may not be able to replicate what may happen in the production environment. For example, it is not unusual for changes to be occurring in the control system as a plasma cluster tool is being manufactured. However, the changes may not always be propagated to all the testers. As a result, the testers may not have all the data to create an environment that resembles the production environment. Further, there may have been changes in the various components, but the manufacturer may not have been informed to accommodate the changes. As a result, changes may not be noticeable until the plasma cluster tool is in the field.

The discussion above illustrates several problems with the current method of testing a plasma cluster tool and its components. First, the lack of testing standards, which may result in a wide range of testing methodology, inhibits manufacturers of cluster tool from being able to provide assurance to their customers that quality tests have been performed on all the components. Second, control logic which is different from the production control logic and which may vary in each test fixture may result in test results which may not capture what will happen in a real production environment. Third, the quality of the data collected may range depending upon the test fixture used and the tester performing the test. Fourth, data reporting lacks consistency. For example, some reports may be electronically produced while other may be in paper format. Finally, since a tester is usually limited to the component he/she is testing and the control logic does not represent a production environment, an integrated system test is not possible.

SUMMARY OF INVENTION

The invention relates, in an embodiment, to a testing arrangement for testing a plasma cluster tool having system control software (SCS) for controlling the plasma cluster tool during production. The testing arrangement includes a data manager module for obtaining, via a computer network, specification data pertaining to a component of the plasma cluster tool. The testing arrangement further includes a test manager module configured to provide a set of tests for testing the component, the set of tests incorporating data obtained in the specification data. The testing arrangement additionally includes a SCS interface engine configured to communicate the set of tests with the system control software of the plasma cluster tool, thereby enabling the SCS to execute at least a test in the set of tests to test the component.

In another embodiment, the invention relates to a method for testing a plasma cluster tool. The method includes providing a system control software (SCS), the system control software representing software for controlling the plasma cluster tool during production. The method further includes providing an automated test and characterization (ATAC) test environment including a data manager module, a test manager module, and a SCS interface module. The data manager module is configured for obtaining, via a computer network, specification data pertaining to a component of the plasma cluster tool. The test manager module is configured to provide a set of tests for testing the component, the set of tests incorporating data obtained in the specification data. The SCS interface engine is configured to communicate the set of tests with the system control software of the plasma cluster tool to enable the system control software to execute at least a test in the set of tests to test the component. The method also includes performing the testing of the component using the ATAC test environment and the SCS.

In yet another embodiment, the invention relates to a testing arrangement for testing a plasma cluster tool having system control software (SCS) for controlling the plasma cluster tool during production. The testing arrangement includes means for obtaining, via a computer network, specification data pertaining to a component of the plasma cluster tool. Further, the testing arrangement includes means for providing a set of tests for testing the component, the set of tests incorporating data obtained in the specification data. Additionally, the testing arrangement includes means for providing the set of tests with the system control software of the plasma cluster tool, thereby enabling the SCS to execute at least a test in the set of tests to test the component.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B shows a chart of the components in FIG. 1A and the testing architecture associated with these components.

DETAILED DESCRIPTION OF EMBODIMENTS

Figure 1A:
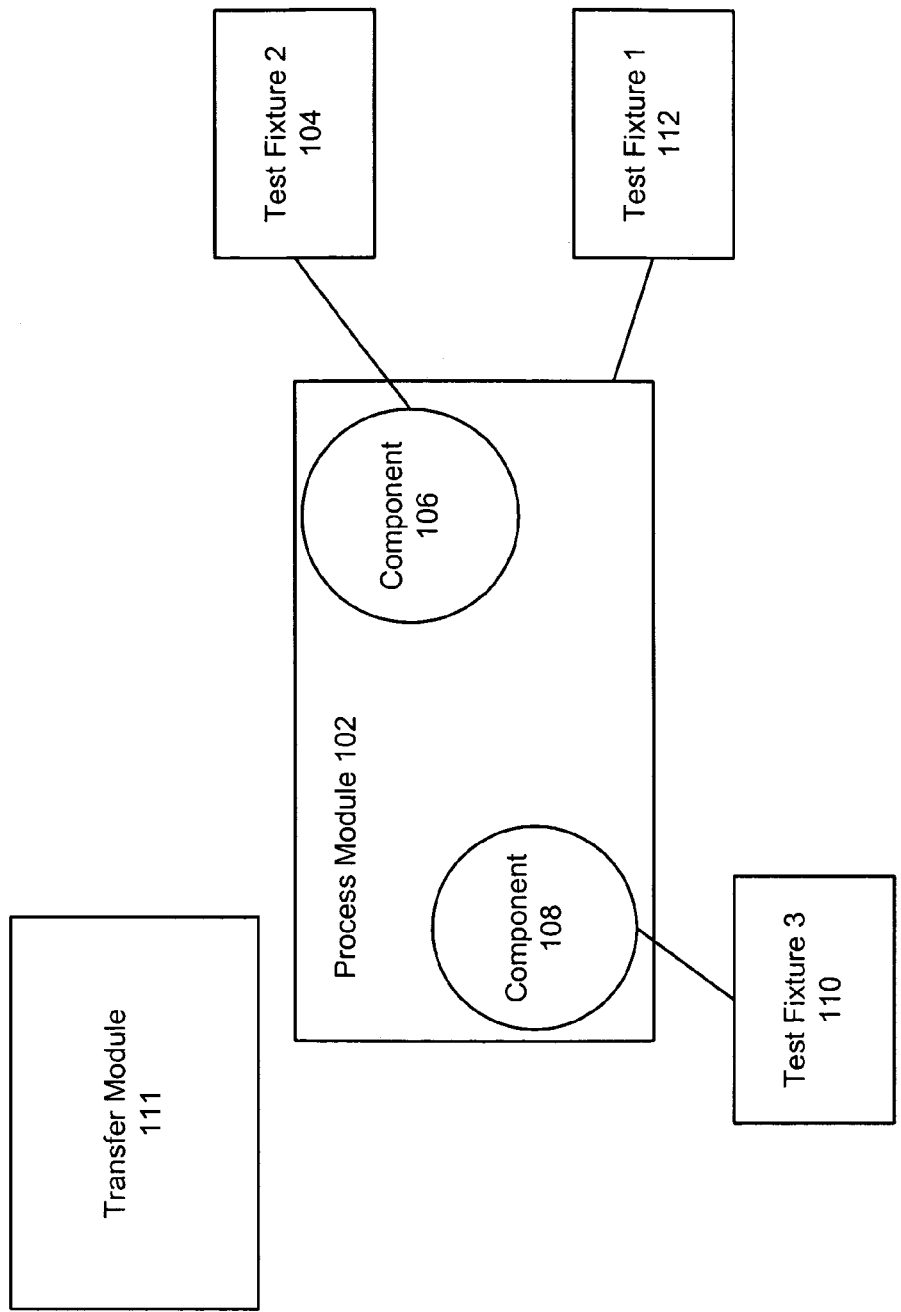
FIG. 1A shows an example of a plasma cluster tool with a process module and a transfer module to facilitate discussion.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, there is provided a testing arrangement that enables the standardization of test methodology and data collection for testing a plasma cluster tool. The test framework, or otherwise known as Automated Test and Characterization (ATAC) system, is placed on top of the system control software (SCS) and reproduces the production environment. The ATAC system allows the manufacturer to control the testing methodology and specifications. Thus, regardless of whether the testing is being performed at the manufacturer or at the suppliers' locations, the manufacturer can be assured that the same testing methodology and specifications are being used. Further, changes in testing methodology or specifications are readily available to the internal and external testers alike.

In an embodiment, the ATAC system allows for simulation to occur by stubbing out components that are not being tested. Since the test environment mirrors the production environment, testing is not just performed on a hardware level but the whole plasma cluster tool and its system control software (SCS) can be tested on an integrated basis. Further, in an embodiment of the invention, the ATAC system provides for data collected during the testing to be transmitted to the manufacturer system in a near real-time environment. As a result, the manufacturer has ready access to the data and is able to manipulate the data for analysis and troubleshooting.

As mentioned before, the ATAC system is a testing arrangement for testing a plasma cluster tool having SCS controlling the plasma cluster tool during production. The ATAC system includes a data manager module for obtaining specification data (i.e., test methodology, test specifications and associated test specifications data) pertaining to a component of the plasma cluster tool. The data manager module obtains the specification data by accessing a computer network. In an embodiment of the invention, the computer network represents the Internet and/or the manufacturer information technology infrastructure. In an embodiment, the data manager is implemented within the .net infrastructure, which is provided and/or maintained by Microsoft Corporation of Redmond, Wash. The same data manager also transports the test result data and/or files from the test fixture to the manufacturer's central test data archive servers upon completion of the tests.

The ATAC system also includes a test manager module configured to execute a set of tests for testing a component. As discussed herein, a set of tests may include one or a multiple of tests. The set of tests includes test specification and associated test specification data downloaded by the data manager module. The tester determines the number of tests that are executed.

The ATAC system also includes a SCS interface engine configured to communicate the set of tests with the SCS of the plasma cluster tool. The SCS interface engine processes the commands that are coded in the test scripts and issues commands to the SCS. In an embodiment of the invention, the SCS interface engine is implemented using Smalltalk, an object-oriented programming language. Information regarding Smalltalk may be found at www.smalltalk.org. Test scripts are written in plain text files consisting of commands following ATAC command syntax.

The data manager module, the test manager module, and the SCS interface engine reside in a host computer, which also contains the SCS for controlling the plasma cluster tool during production. These different parts work together to create an environment for testing a component and gathering the test results. In an embodiment of the invention, the test results are transferred (using an appropriate software and/or hardware component) to the manufacturer's test data archive servers via the computer network. The test results, stored on the archive servers, are accessible to anyone who has authorization to access the data.

For example, a manufacturer is building a new plasma cluster tool. Some of the parts are being produced internally while other components are being outsourced to suppliers. The test framework that the testers, both internally and externally, use to test the components is the ATAC system. To perform a test on a component, the tester, regardless if the tester is internally or externally located, hooks an ATAC test fixture to the component being tested. An ATAC test fixture, as discussed herein, is a test fixture which has the ATAC system built into it. Once the component being tested is hooked to the ATAC test fixture, the tester is able to access the manufacturer site and to indicate the component that is being tested. The other components that may be found in a plasma cluster tool are stubbed out (i.e., simulated as though these components exist and are operational).

Correct test specifications and methodology are downloaded onto the ATAC system. Testing begins and data collected from the testing is unloaded onto the manufacturer test data archive servers (either on demand by the tester while the testing is being performed or all at once when the testing has been completed). The data is now readily available to the manufacturer, testers, and the suppliers for analysis. Furthermore, the data is also available to the field engineers and the customers when problems arise.

Figure 2A:
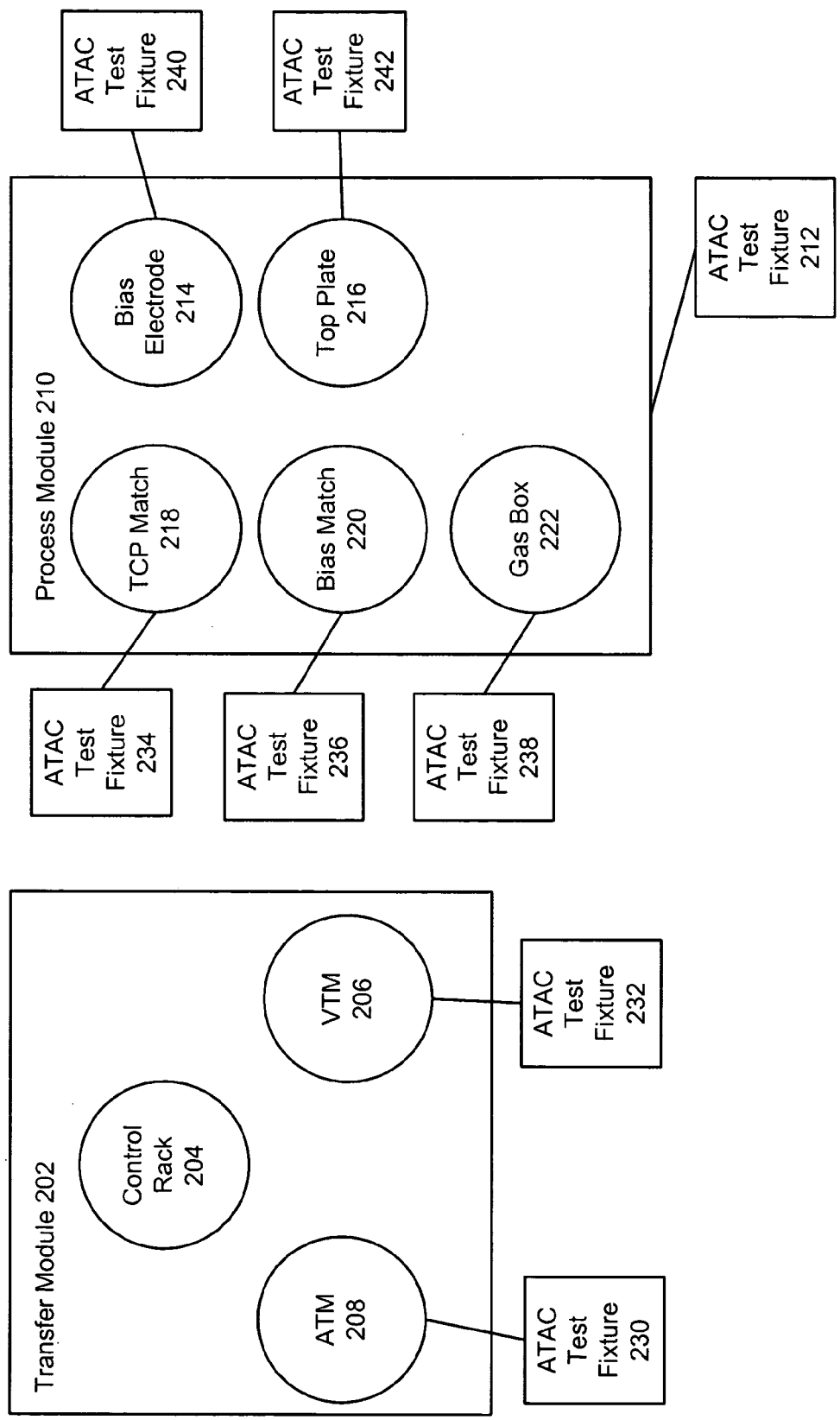
FIG. 2A shows, in an embodiment of the invention, a plasma cluster tool with attached ATAC test fixtures.

The features and advantages of the invention may be better understood with reference to the figures and discussions that follow. FIG. 2A shows an example of a plasma cluster tool with attached ATAC test fixtures. The plasma cluster tool shows a process module 210 and a transfer module 202. In transfer module 202 is a control rack 204, a vacuum transfer module (VTM) 206, and an atmospheric transfer module (ATM) 208. Attached to VTM 206 and ATM 208 are ATAC test fixtures 232 and 230, respectively. In this example, there is not shown an ATAC test fixture for control rack 204. Control rack 240 is where the control computer and the power distribution hardware reside. In an embodiment of the invention, an ATAC test fixture may exist for all components; however, components lacking sufficiently complex functionality and/or control logic (i.e., Control Rack) may not need an ATAC test fixture.

In process module 210, components that may exist include (but are not limited to) a TCP match 218 (with an ATAC test fixture 234), a bias match 220 (with an ATAC test fixture 236), a gas box 222 (with an ATAC test fixture 238), a bias electrode 214 (with an ATAC test fixture 240) and a top plate 216 (with an ATAC test fixture 242). There is also an ATAC test fixture 212 attached to process module 210. With the exception of the ATAC test fixtures, these and other major components of a cluster tool are well known to those skilled in the art. Thus, these major components will not be listed or discussed in details herein.

Figure 2B:
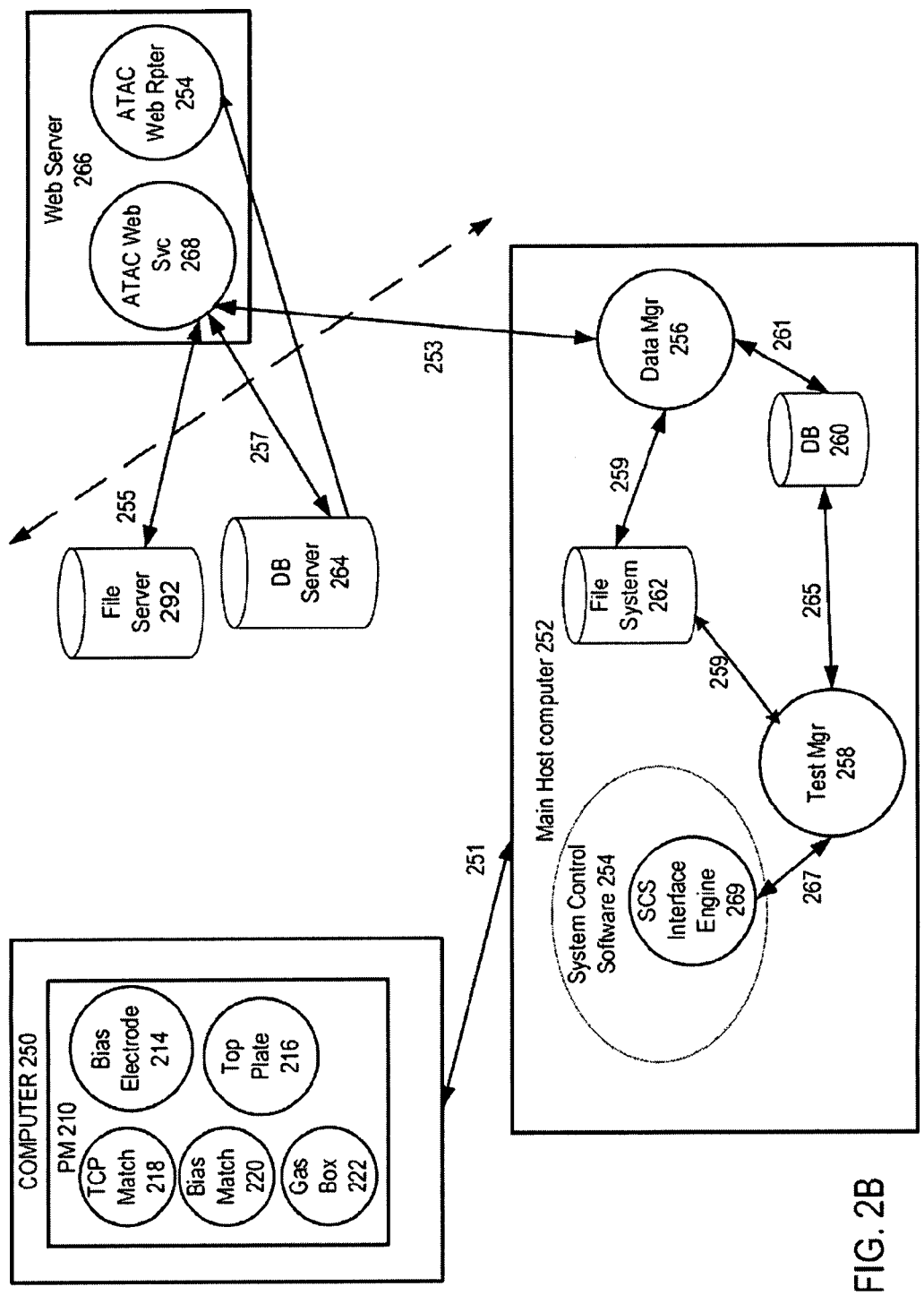
FIG. 2B shows, in an embodiment of the invention, the architecture of the ATAC test framework.

FIG. 2B shows, in an embodiment of the invention, the architecture of the ATAC test framework. A main host computer 252 has a system control software (SCS) 254 running on it. SCS 254 is the same system control software that is implemented for the plasma cluster tool in the production environment. As a result, tests are performed with the benefits of a simulated production environment.

Also residing on main host computer 252 is a data manager module 256. Data manager module 256 is a data transport agent that allows specification data to be loaded onto and result test data unloaded from main host computer 252 and the test data archive servers (i.e., web server 266) via path 253, which may be via the Internet. An ATAC web service 268, which resides on web server 266, implements a secure Internet environment. Thus, to gain access to ATAC web service 268, a user has to provide authentication data (i.e., user name and password).

If data manager module 256 wants to retrieve specification data from the manufacturer, a request is made via path 253 to ATAC web service 268. ATAC web service 268 then retrieves the specification data from a file server 292 via path 255 and/or from a database server 264 via path 257. For example, recipes may be stored as a file on file server 292. On the other hand, minimal and maximum of capacitance may be stored on database 264. In an embodiment, file server 292 and database server 264 may reside on the manufacturer internal infrastructure. The specification data are then sent via path 253 to data manager module 256. Data manager module 256 stores the specification data in a file system 262 (via path 259) and a database 260 (via path 261). File system 262 and database 260 are located locally on main host computer 252.

Also residing on main host computer 252 is a test manager module 258. A tester uses test manager module 258 to select a test scenario (i.e., perform a standard test, perform troubleshooting, perform diagnostic, etc.) for the component being tested. For each test scenario, there is a set of tests (i.e., testing functionality) that may be available. A set of tests may include one or more tests. The tester may choose to perform all or some of the tests. The test scenarios and set of tests are derived from the test specifications and associated test specification data that have been downloaded by data manager module 256 from ATAC web service 268 and stored in file system 262 and database 260. Test manager 258 is implemented in Java™ (available from Sun Microsystems, Inc. of Mountain View, Calif.), in an embodiment.

Once the test sequence has been activated, test manager 258 interacts with a SCS interface engine 269 via path 267. SCS interface engine 269 communicates the set of tests with SCS 254 of the plasma cluster tool. SCS interface engine 269 processes the commands that are coded in the test scripts and issues commands to SCS 254. In an embodiment of the invention, SCS interface engine 269 is implemented using Smalltalk, an object-oriented programming language.

Test results are gathered and saved on file system 262 and database 260. An example of test results that may be saved in file system 262 is a data log file. Examples of test results that may be saved in database 260 are the pressure measurements in a process module.

Test results may be unloaded to ATAC web services 268 immediately after a test has been performed, after a test scenario has been completed, or after all tests have been performed on the components. In an embodiment of the invention, test manager module 258 is shut down when test results are unloaded onto ATAC web services 268. Test manager module 258 is shut down to prevent potential data conflict. To unload the test results, data manager module 256 retrieves the test results stored in file system 262 and database 260 and unload the test results to ATAC web service 268 which then stores the test results in file server 292 and database server 264.

Test results are accessible to all those who have authorized access. The test results may be accessible as soon as the test results are unloaded onto ATAC web service 268. Test results may be viewed using a data viewer (i.e., ATAC web reporter 254), a report application that allows the user to view data and to create report.

Figure 3:
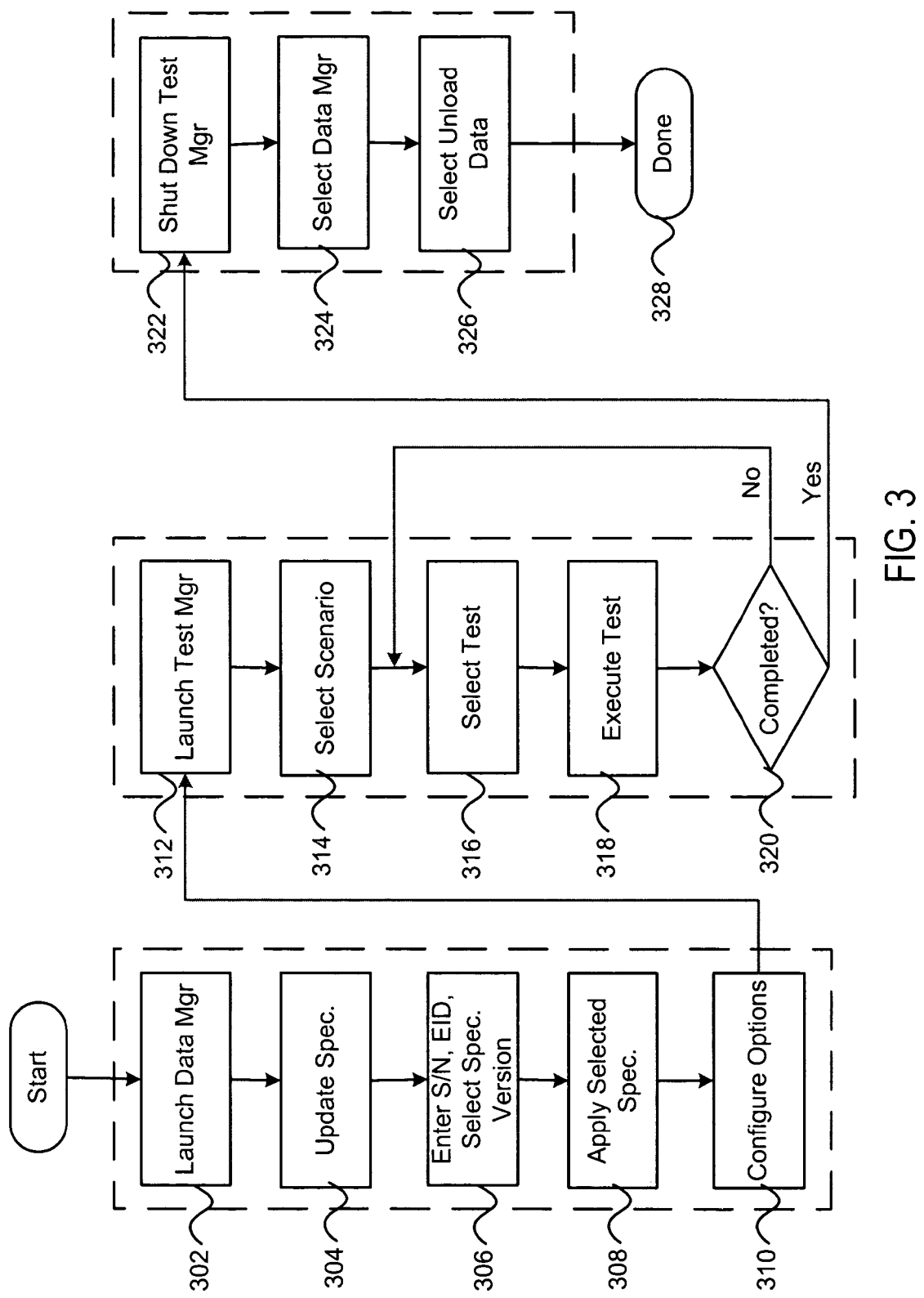
FIG. 3 shows, in an embodiment, a simplified flowchart for testing a component of a plasma cluster tool using the ATAC system.

FIG. 3 shows, in an embodiment, a simplified flowchart for testing a component of a plasma cluster tool using the ATAC system. FIG. 3 is discussed in relation to FIG. 2B. For example, one of the components (such as Bias Electrode 214, TCP Match 218, Bias Match 220, Gas Box 222, or Top Plate 216) in process module 210 needs to be tested. An ATAC test fixture is connected to the component that needs to be tested. For example, main host computer 252 is connected to a computer 250 (i.e., VME), which controls process module 210 and its components. Once main host computer 252 with its built-in ATAC system is connected to computer 250, the ATAC system provides the test frameworks and interface.

At step 302, the data manager module is launched. To begin testing the component, computer 250 communicates with main host computer 252 via path 251 to initiate the testing process and launch data manager module 256.

At step 304, the tester pushes the button that enables the specification data to be updated. Data manager 256 connects with the manufacturer's computer network (i.e., ATAC web services 268) and downloads all the specification data (e.g., different versions of the specification data in an embodiment). As mentioned before, access to the computer network (i.e., ATAC web services 268) is granted once the tester provides authentication information (i.e., user name and password). In an embodiment, if testing of a component is performed multiple times, then in future downloads, only the differences of the specification data may be downloaded.

To download the specification data to data manager module 256, the computer network (i.e., ATAC web services 264) retrieves specification data from file server 292 and database server 264. Specification data that are retrieved from file server 292 and database server 264 are downloaded to data manager module 256 and stored in file system 262 and database 260.

Once the specification data has been updated, the user enters identification information about the component (i.e., serial number, equipment ID, etc.) and chooses the version of the specification data at step 306. At step 308, the selected version of the specification data is applied by being copied to all the runtime directories. At step 310, the tester configures the options that are specific to the component. For example, a gas box is configured based on how many gas lines it may have (i.e., 12 gas line), how many boxes it may have (i.e., 16 boxes), the number of feed lines the gas box may have (i.e., dual gas feed or not).

At step 312, the tester launches the test manager module to select the test scenario(s) (step 314). For example, a tester wants to perform a standard set of tests on a gas box. Once a test scenario is chosen, the set of tests associated with the test scenario is made available to the tester. At step 316, the tester chooses the tests to be executed. For example, the standard set of tests on a gas box may include 40 tests that can be performed. Of those 40 tests, the tester may choose to execute all or just a select few. Test manager module 258 uses the specification data stored in file system 262 and in database 260 to select the test scenario and set of tests that will be executed.

At step 318, each test is executed. SCS interface engine 269 communicates with test manager module 258 to retrieve the test sequence. SCS interface engine 269 processes the commands that are coded in the test scripts and issues commands to SCS 254 to begin testing. Based on the information received, SCS 254 stubs out all components that are not being tested and initiates the testing sequence. In an embodiment of the invention, the SCS interface engine 269 is implemented using Smalltalk, an object-oriented programming language.

The data gathered during each test is sent via test manager module 258 to file system 262 and database 260. At step 320, if additional tests are desired, the tester returns to step 316 and selects a new test. This process continues until all tests that a tester wants to perform have been completed. Once all tests have been completed, the tester shuts down the test manager at step 322.

In an embodiment of the invention, test results may be unloaded onto ATAC web services 268 after the completion of a test or after the completion of a test scenario. For example, there are 40 tests being conducted for a test scenario. At the end of each test, the tester can shut down the test manager module to unload the data. When the tester re-launches the test manager module, the system provides the tester with a status of each test and an opportunity to continue testing. As a result, the ability to unload test results more frequently enables the tester and other who may be interested in the test result a near-time access to the test results, which then allows analysis to be performed and troubleshooting to occur.

At step 324, data manager module is activated to begin unloading data (step 326). For example, data manager module 256 retrieves the test results from file system 262 and database 260 and sends the test results to ATAC web service 268. The test results are stored at file server 292 and database server 264 and are accessible to any user who is authorized to view the results (i.e., field engineers, suppliers, customers, etc.) At step 328, the testing is completed for the component and the tester may use ATAC web reporter 254 to view the data.

Figure 4:
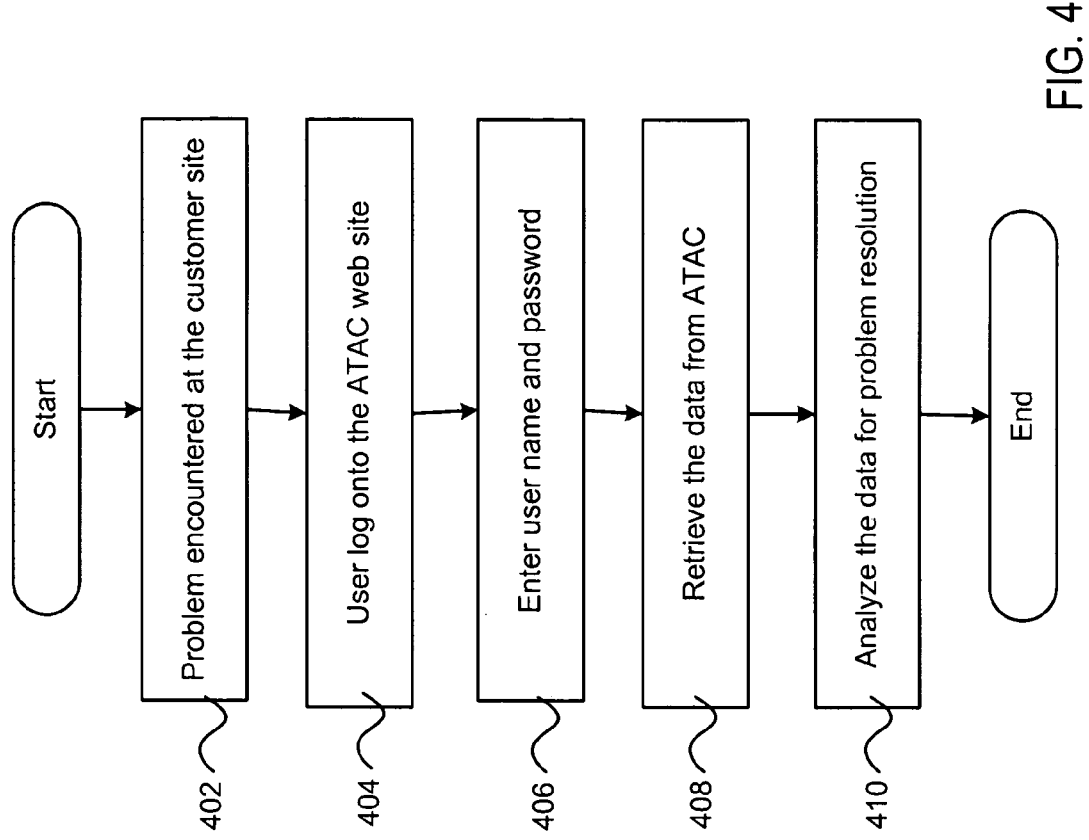
FIG. 4 shows, in an embodiment, a simplified flowchart for using the ATAC system to perform problem resolution.

FIG. 4 shows, in an embodiment, a simplified flowchart for using the ATAC system to perform problem resolution. In step 402, a problem with the plasma cluster tool is encountered at the customer site. At step 404, a user (i.e., field engineer) logs onto the ATAC web site. At step 406, the user enters the user name and password to access the ATAC web site. At step 408, the user is able to retrieve the test results from ATAC. At step 410, the user does problem resolution by analyzing the test results.

The following example illustrates how problem resolution may be performed using the test results that have been stored on the computer network, where the data are easily accessible to those who are authorized to view the test results. For example, a plasma cluster tool is being set up at a customer site by a field engineer. Upon setup, the plasma cluster tool does not pass a VCI no-plasma test. A VCI is a device on a processing module which monitors the voltage control scheme of a processing module. The VCI no-plasma test requires that the slope be within a set range. However, test results at the customer site are out of the lower end of the spectrum.

The field engineer logs onto the ATAC web site and readily retrieves the test results. Upon analysis, the field engineer is able to detect that during testing, the slope was already trending toward the lower end of the spectrum (even though it was within the range). Also, the field engineer analyzes the data associated with the same configuration and is able to determine the time when the slope started to trend downward. Based on the data, the field engineer is able to trace the problem to an event that happened during that time. Upon further investigation, the problem was traced back to a supplier who was supplying the electrodes. With the data readily available via the ATAC web service, the field engineer is able to quickly pinpoint the problem. In the past, the analysis could have taken weeks or months.

As can be appreciated from the foregoing, embodiments of the invention provides for a test framework for testing a plasma cluster tool that includes system control software for controlling the plasma cluster tool during production. In combination with an ATAC system (including a data manager module, a test manager module, a system control software interface engine, a computer network, and a data viewer), a tester is able perform an integrated test. With the ATAC system, the tester is not only testing a component, but the tester is also testing the software and control system. Further, since the test fixtures include the ATAC system, the manufacturers are now able to control the testing methodology and testing specifications. As a result, any changes that may occur can be readily pushed out to the testers; the testers are able to download the changes the next time they launch the data manager module. Moreover, the ATAC system allows for near real-time unload of data; thus, those who are authorized to access the data now have ready access to the test results to perform data analysis and troubleshooting.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A testing arrangement for testing a plasma cluster tool having system control software (SCS) for controlling said plasma cluster tool during production, the testing arrangement comprising:
    a data manager module for obtaining, via a computer network, specification data pertaining to a component of said plasma cluster tool, said specification data including at least simulation data for simulating operation of other possible hardware components of said plasma cluster tool other than said component of said plasma cluster tool;
    a test manager module configured to provide a set of tests for testing said component, said set of tests incorporating data obtained in said specification data; and
    a SCS interface engine configured to communicate said set of tests with said system control software of said plasma cluster tool, thereby enabling said SCS to execute at least a test in said set of tests to test said component of said plasma cluster tool, said test including at least simulated operation of said other possible hardware components of said plasma cluster tool according to said specification data.

2. The testing arrangement of claim 1 wherein said component of said plasma cluster tool represents at least one of a TCP match, a bias match, a gas box, a bias electrode, and a top plate of a process module of said plasma cluster tool.

3. The testing arrangement of claim 1 wherein said SCS interface engine, said SCS, said data manager, and said test manager reside on a same host computer, said host computer connected to a computer, said computer configured to control said component of said plasma cluster tool.

4. The testing arrangement of claim 1 further comprising a second data manager, a second test manager, and a second SCS interface engine for testing a second component of said plasma cluster tool.

5. The testing arrangement of claim 1 wherein said specification data further includes at least a plasma processing recipe and a capacitance range, said recipe retrieved from a file server, said capacitance range retrieved from a database.

6. The testing arrangement of claim 1 wherein said test manager is configured to be shut down when results of said test are unloaded to a web service.

7. The testing arrangement of claim 1 wherein said other possible hardware components of said plasma cluster tool do not exist in said plasma cluster tool when said component of said plasma cluster tool is tested.

8. The testing arrangement of claim 1 wherein said specification data is obtained from a computer internal to an IT infrastructure of a manufacturer of said plasma cluster tool.

9. The testing arrangement of claim 8 wherein said computer internal to said IT infrastructure is accessible only after proper authentication.

10. The testing arrangement of claim 1 further comprising means for archiving test results on a database managed within an IT infrastructure of a manufacturer of said plasma cluster tool.

11. A method for testing a plasma cluster tool, comprising:
obtaining, via a computer network, specification data pertaining to a component of said plasma cluster tool, said specification data including at least simulation data for simulating operation of other possible hardware components of said plasma cluster tool other than said component of said plasma cluster tool;
providing a set of tests for testing said component of said plasma cluster tool, said set of tests incorporating data obtained in said specification data;
communicating said set of tests with a system control software of said plasma cluster tool to enable said system control software to execute at least a test in said set of tests to test said component of said plasma cluster tool; and
performing said test, said test including at least simulated operation of said other possible hardware components of said plasma cluster tool according to said specification data.

12. The method of claim 11 wherein said other possible hardware components of said plasma cluster tool includes one or more of a TCP match, a bias match, a gas box, a bias electrode, a top plate, a vacuum transfer module, an atmospheric transfer module.

13. The method of claim 11 further comprising receiving user input pertaining to identification of said component of said plasma cluster tool.

14. The method of claim 11 further comprising receiving user input pertaining to options specific to said component of said plasma cluster tool.

15. The method of claim 11 further comprising receiving user selection of one or more test scenarios.

16. The method of claim 15 further comprising:
shutting down a software module configured for receiving said user selection of said one or more scenarios; and
after said shutting down said software module, unloading results of said test to a web service.

17. The method of claim 11 wherein said system control software reside on a host computer configured to control said plasma cluster tool during production.

18. The method of claim 11 wherein said other possible hardware components of said plasma cluster tool do not exist in said plasma cluster tool when said component of said plasma cluster tool is tested.

19. The method of claim 11 wherein said specification data is obtained from a computer internal to an IT infrastructure of a manufacturer of said plasma cluster tool.

20. A testing arrangement for testing a plasma cluster tool having system control software (SCS) for controlling said plasma cluster tool during production, comprising:
means for obtaining, via a computer network, specification data pertaining to a component of said plasma cluster tool, said specification data including at least simulation data for simulating operation of other possible hardware components of said plasma cluster tool other than said component of said plasma cluster tool;
means for providing a set of tests for testing said component of said plasma cluster tool, said set of tests incorporating data obtained in said specification data; and
means for providing said set of tests with said system control software of said plasma cluster tool, thereby enabling said SCS to execute at least a test in said set of tests to test said component of said plasma cluster tool, said test including at least simulated operation of said other possible hardware components of said plasma cluster tool according to said specification data.

21. The testing arrangement of claim 20 wherein said other possible hardware components of said plasma cluster tool do not exist in said plasma cluster tool when said component of said plasma cluster tool is tested.

22. The testing arrangement of claim 20 wherein said specification data is obtained from a computer internal to an IT infrastructure of a manufacturer of said plasma cluster tool.

\* \* \* \* \*